April 2, 1963     D. K. WILSON     3,084,261
SUN TRACKER
Filed Feb. 24, 1960                                             5 Sheets—Sheet 5
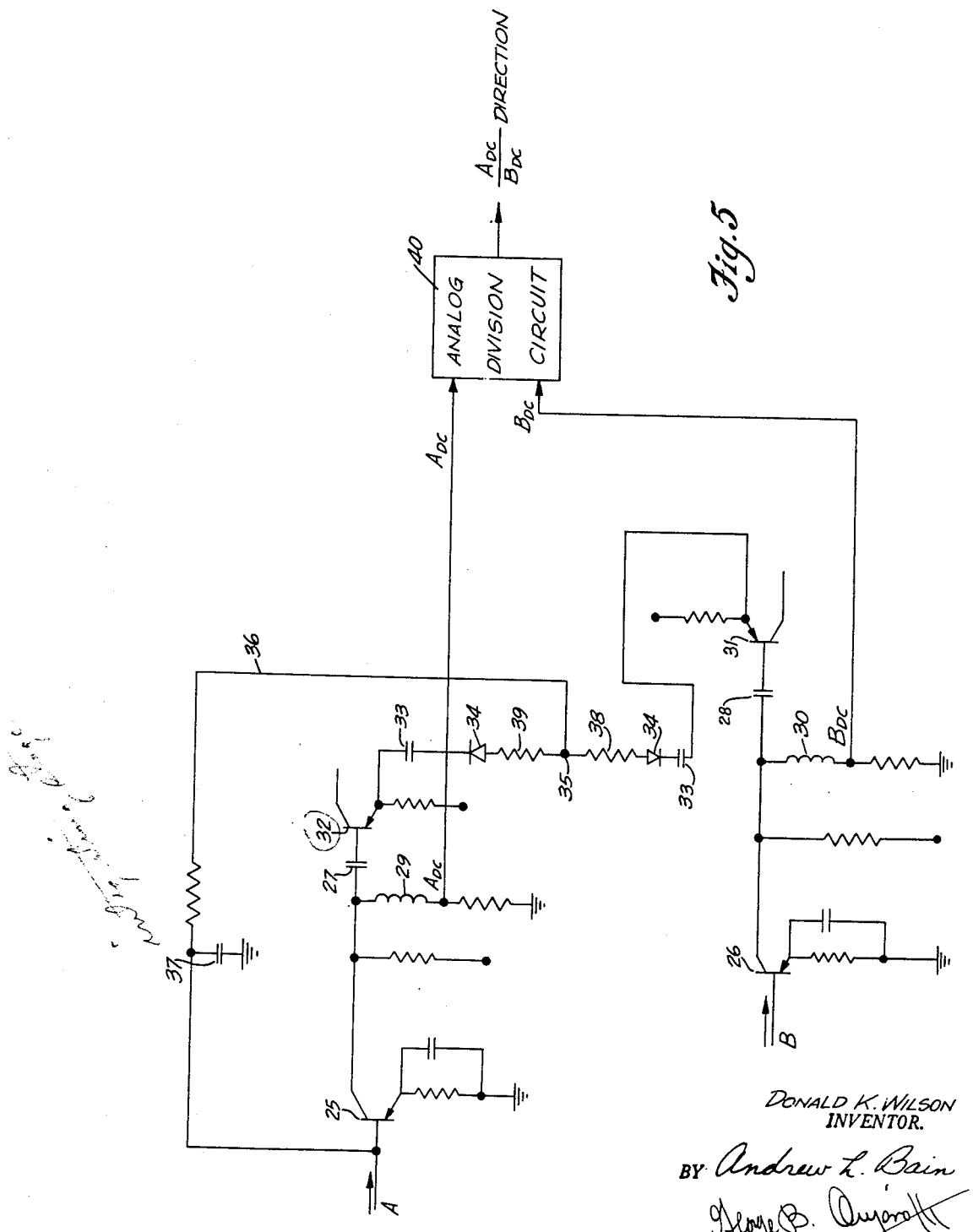
DONALD K. WILSON
INVENTOR.
BY Andrew L. Bain
George B. Oupro
ATTORNEYS

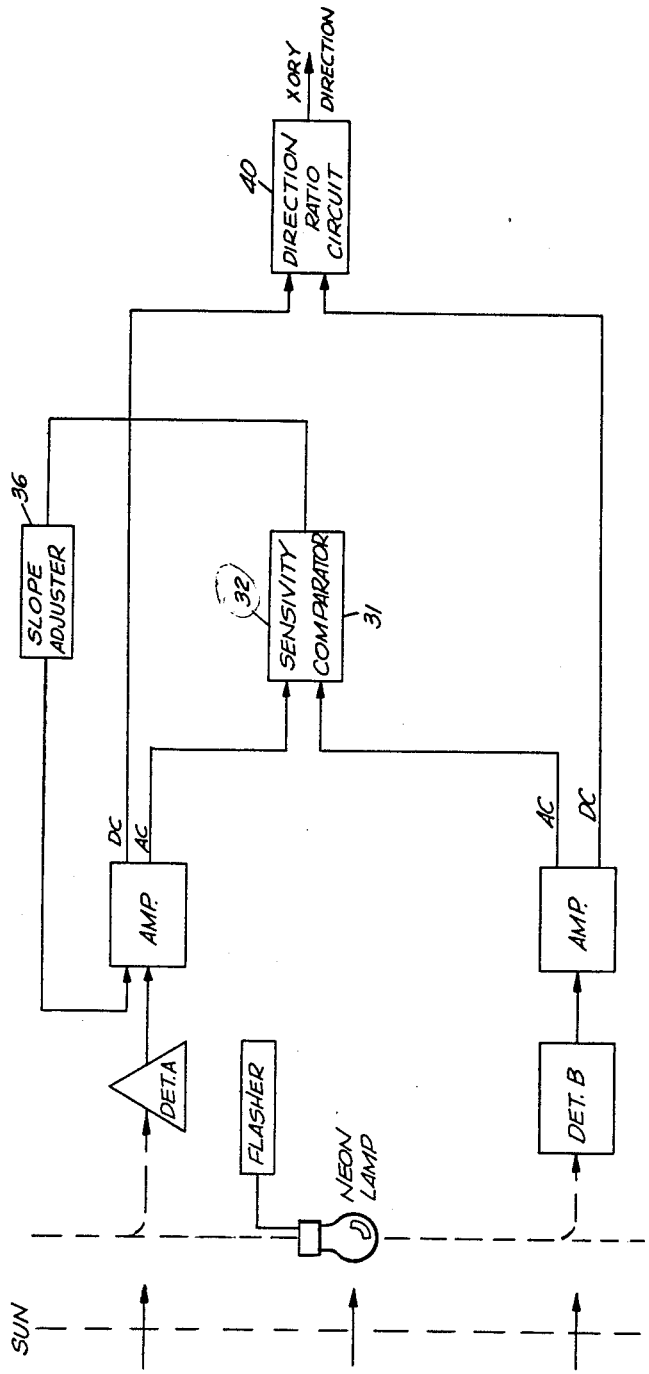

United States Patent Office 3,084,261
Patented Apr. 2, 1963

3,084,261
SUN TRACKER
Donald K. Wilson, North Caldwell, N.J., assignor to General Precision, Inc., Little Falls, N.J., a corporation of Delaware
Filed Feb. 24, 1960, Ser. No. 10,675
9 Claims. (Cl. 250—203)

The present invention relates to the guidance of a manned or unmanned vehicle by tracking the sun.

The principal purpose of a sun tracker is to provide vehicle-sun angular directional information in azimuth and elevation; the sun bearing being normally obtained by reading the angle of the sun tracker with respect to the vehicle, i.e., the device usually physically tracks the sun, e.g., a telescopic instrument is constantly pointed at the sun by a servomechanism. Thus, power is required to operate the servomechanism, and, in space travel or, in an unmanned vehicle, there is always a possibility of a breakdown in the servomechanism, and repairs may be difficult or impossible. Although some attempts may have been made to provide a small, compact, solid state system or device which does not physically move about, none, as far as I am aware were successful when carried out into actual practice.

It has now been discovered that means can be provided for automatically tracking the sun from a vehicle without physically moving the sun tracker.

It is an object of the present invention to provide a device for tracking the sun which is small, compact, accurate, efficient, of simple design and which can be used not only in atmosphere, but in manned or unmanned space vehicles.

Another object of the present invention is to provide a manner of tracking the sun from a vehicle.

The invention in its broader aspects contemplates a telescopic system which will project the sun image onto two sets of detectors, disposed in such a manner that the ratio of illumination on one detector in one set as compared with another detector in the same set will indicate one bearing of the sun e.g., azimuth; and the like ratio in the other set will indicate the other bearing of the sun, e.g., elevation.

The invention as well as its many objects and advantages will become more apparent from the following description taken in conjunction with the accompanying drawing in which:

FIG. 4 illustrates in block diagram the equalization of the detectors for the device contemplated in FIG. 3.

FIG. 5 is a schematic diagram illustrating details for equalization and centering of the detectors shown in the block diagram of FIG. 4.

Figure 1:
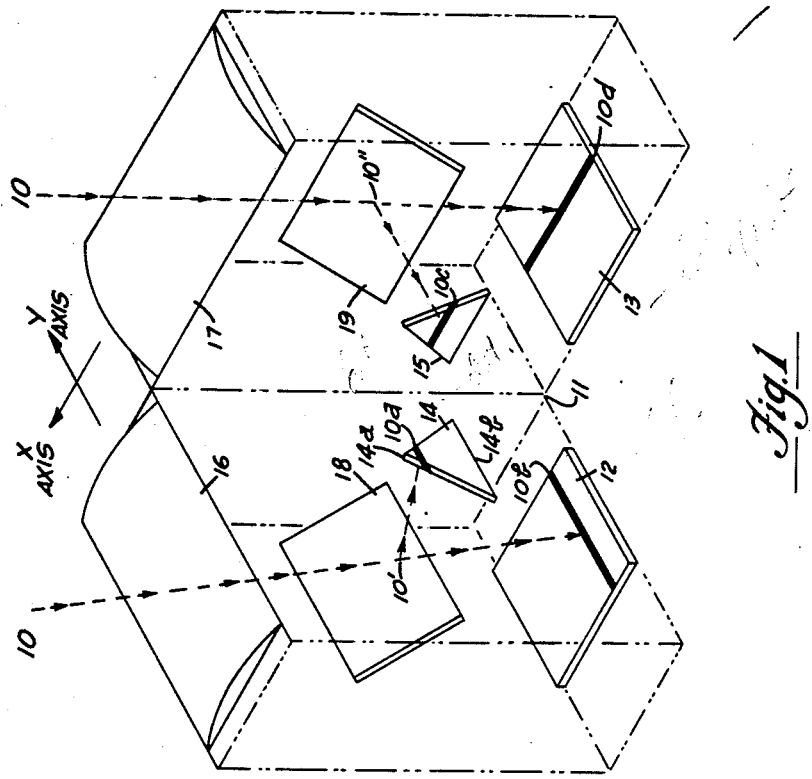
FIG. 1 illustrates the principles involved in determining the sun bearing according to the present invention.
Figure 2:
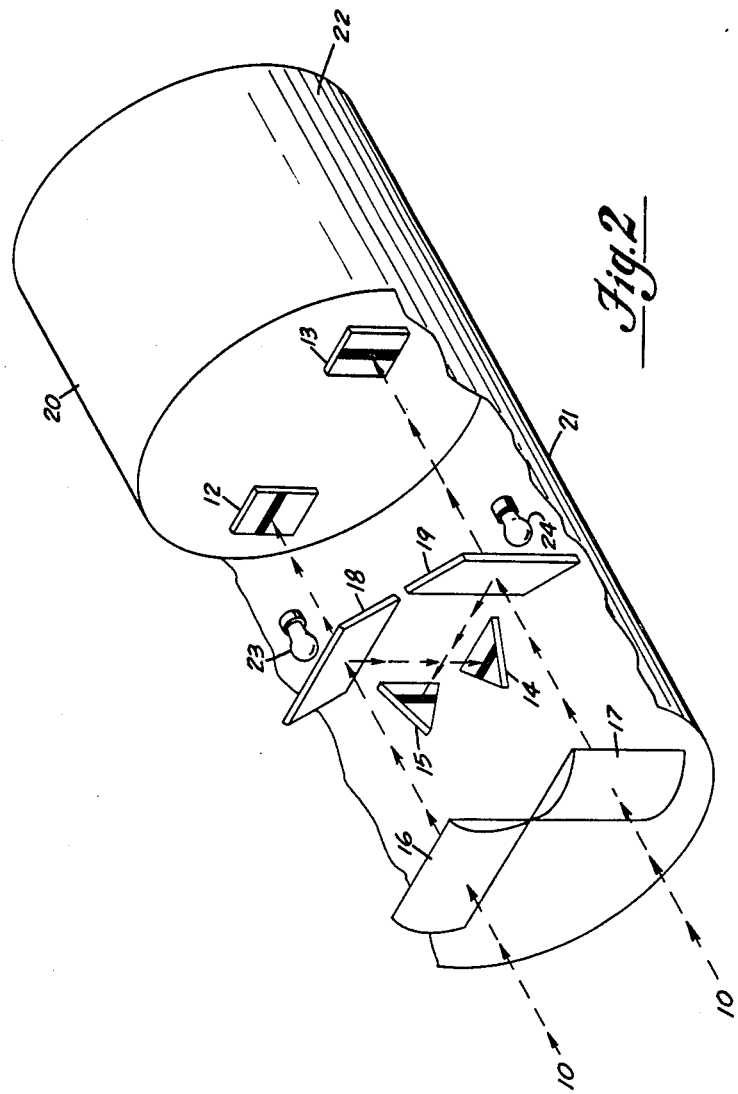
FIG. 2 is a longitudinal view of an embodiment of the invention herein contemplated partially cut open to show the disposition of the components illustrated in FIG. 1.

Generally speaking, the present invention contemplates a telescopic system 11 adapted to project the sun image 10 as perpendicular X and Y lines onto X and Y detector sections. Each section contains a rectangular detector 12 and 13, and a triangular detector 14 and 15. The sun images 10' and 10" is projected by cylindrical lens 16 and 17 which are at right angles to each other. The image is 50 percent beamsplit by beam splitters 18 and 19. When the sun is over the longitudinal centerline of one of the cylindrical lens, e.g., as shown in FIG. 1, in connection with lens 17, regardless of its position along the centerline, and provided the sun is within the field of view of the telescopic system, the sun image will be a straight line 10d exactly halfway up triangular detector 15. If on the other hand, the sun is not over the centerline of the lens, e.g., as in the case of lens 16, then, the sun image on the square detector 12 will be a straight line 10b across the square, but towards the "top" or "bottom" of the square, and a straight line 10a across the triangle, either towards the base 14b, or towards the peak 14a of the triangle. When the sun is over the centerline, as in the case of lens 17, the image on the triangle 10c under the conditions depicted in FIG. 1, is exactly one-half the size of the image on the rectangle 10d. The bearing of the sun in the X or Y direction can therefore be ascertained from the ratio of the sun image on the triangle to that on the rectangle.

To embody the theoretical principles illustrated in FIG. 1 in a practical device, it is necessary to provide the combination of a viewing section capable of projecting the sun image as two lines at right angles to each other; a detection section adapted to have each line image of the sun projected by the viewing means sensed by at least two detectors; one detector, whose geometric configuration is so disposed with regard to the viewing section as to constantly sense the entire projected sun image, and the other detector having a geometrical configuration whose cross sectional linear dimension varies linearly from the central portion thereof, and so disposed with respect to said viewing section that the sensed image will vary likewise depending on the sun bearing, equalization means for each section to obtain a ratio of detector output between the detectors in each section which will correspond to the ratio of the sun image size on one detector as compared with the sun image size on the other detector in said section, and, a division circuit to divide the output of one detector in a section by the output of the other detector in said section.

In carrying the invention into practice, the components depicted in FIG. 1, are contained in cylindrical housing 20. The telescopic portion 21 is located at the front and the electronics package 22 at the rear of the apparatus. The disposition of the optical components is as described in connection with FIG. 1. Behind each beam splitter, 18 and 19, is a neon calibration bulb 23 and 24. The beam splitter divides the bulb light between the two detectors in each section, for purposes which will be hereinafter described. The components just described can be fairly small and can be incorporated in a housing about 2½ inches diameter and six inches long. Each cylindrical lens is about 1 cm.×2 cm. and has a 5 cm. focal length. A line image of the sun about 2 cm. long is projected onto the detector cells.

Detectors 12, 13, 14 and 15 are preferably silicon photovoltaic cells. In this type of cell, the output current is directly proportional to the input illumination, and, for the purpose of the present invention, it is essential that a linear equation describes the cell output, and, that at zero illumination, there should be zero output. In other words, the responses of all cells in respect to light are straight lines, intersecting at the origin, or zero when there is no light, but of different slopes. Silicon cells respond to light from $0.4\mu$ to $1.5\mu$ wavelengths, with a peak sensitivity at $0.85\mu$. Output current is linearly dependent upon cell area and varies directly with the level of illumination. Temperature range of operation is from $-65°$ C. to $+175°$ C. with power output efficiency varying linearly between 135% to 20% at these temperatures respectively. Response time of the cell is $20\mu$—second or less, depending upon load resistance. Since no two photo-detectors have identical characteristics, and furthermore, an individual detector's characteristics drift with time and temperature, it is necessary to calibrate continuously the detectors with respect to each other. The explanation of the calibration will best be understood with reference to FIG. 3. Here, we consider two of the detectors, 12 and 14 or 13 and 15, which for convenience we term detector A for the triangle, and detector B for the square, to determine what signifies that the solar illumination on each cell is equal.

Figure 3:
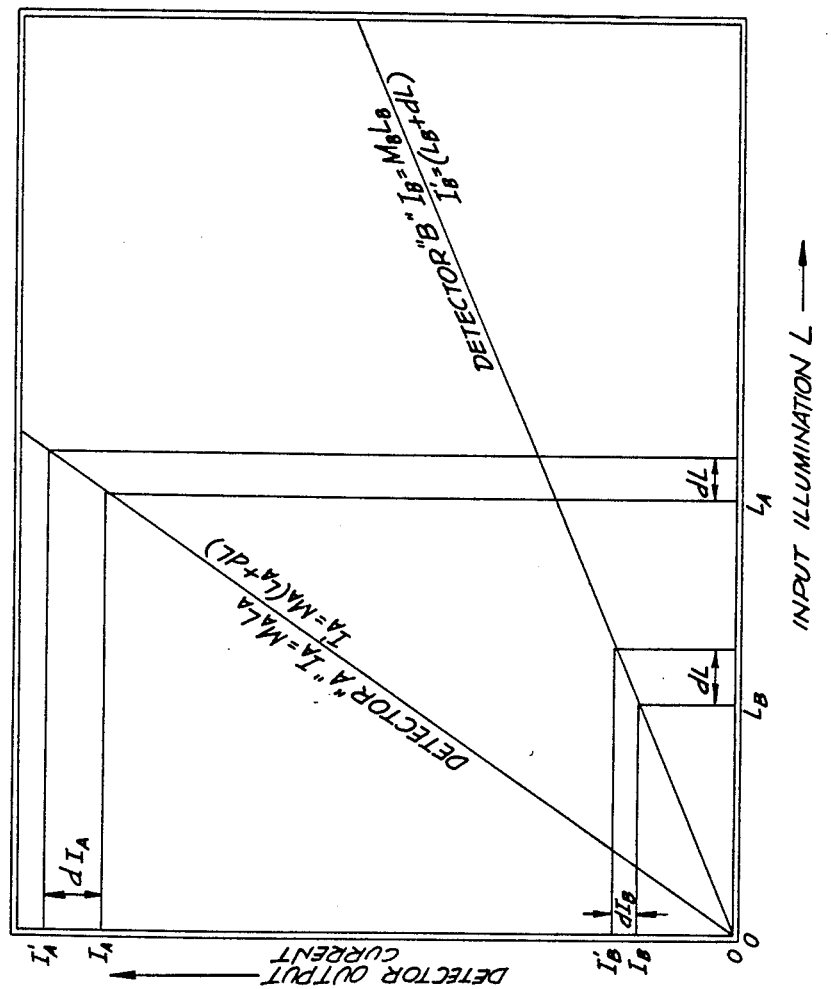
FIG. 3 is a graphic analysis of detector equalization.

At the outset, attention must be directed to the fact that in the preferred embodiment hereinabove described, for an on-center image of the sun 10 on both the triangle 10c and the square, 10d, the output of detector A, the triangular detector would normally be ½ that of detector B, the rectangular detector. In such event, proper compensation must be made in the electronic circuit hereinafter described when equalizing the detectors. However, it is also possible to increase the triangular area so that under the conditions stated, the line image would be of equal length on the triangle and on the square, in which case, the electronic compensation would not be required, but the apparatus might have to be larger than described. Since the electronic compensation is rather simple, the apparatus hereinbefore described, with the triangle having an area of ½ that of the square is probably preferable. But, for the explanation of the theoretical principles involved, as depicted in FIG. 3, it is assumed that the area of the triangle is $\sqrt{3}\times$ that of the square and that the on-center sun images on the square and triangle are of equal length.

When the sun's disk image illuminates A and B, the amount of light on each is $L_A$ and $L_B$ respectively. As already stated, the detectors must be such that at zero illumination, there is zero output. Thus, for the amount of illumination $L_A$ there is $I_A$ output current and for the illumination $L_B$ there is $I_B$ output current, and the output current $I_A$ need not be equal to $I_B$ even though both $L_A$ and $L_B$ are equal. A graph of the output of both detectors A and B can be made where detector A has an output slope of $M_A$ and detector B has an output slope of $M_B$. Thus, $I_A = M_A x L_A$ and $I_B = M_B \times L_B$. If a lamp is so disposel in relation to detectors A and B that it will illuminate A and B equally, when this lamp is flashed on, it will increase the input light on each cell by an amount $dL$ so that under the ideal conditions described $I_A' = M_A (L_A + dL)$ and $I_B' = M_A (L_B + dL)$. Since under the conditions given $L_A = L_B$, then, by equating, $$I_A/I_A' = I_B/I_B'$$

To calibrate the detectors, there is provided therefore, neon calibration bulbs 23 and 24 in the vicinity of each pair of detector cells, preferably behind the beam splitter. Thus, the beam-splitter divides the bulb light between the two detectors in each section. In this way, there is achieved the condition $L_A + dL$ and $L_B + dL$ hereinbefore described. Since light from the sun, i.e., $L_A$ and $L_B$ is continuous, this gives rise to a D.C. detector output. And, since light from a neon bulb is flashing on and off, the light from the bulb $dL$ gives rise to a pulsating square wave, which for the purpose of the present invention can be called A.C.

As depicted in the block diagram, and the schematic illustration, the output on the detectors 12 and 14 or 13 and 15, shown in the drawing as A and B, is first amplified in an amplification stage which may consist of simply a transistor circuit, 25 and 26. The detector whose geometrical configuration is such as to constantly sense the entire sun image, i.e., the square detector is the reference point for adjusting or equalizing the other detector. Past the amplification stage, 25 and 26, the D.C. is removed by a branch circuit with condensors 27 and 28 in one branch, and an inductance coil, 29 and 30 in the other. The D.C. not being able to jump across the condensor goes along the path of the coil, which acts as a choke to block off the A.C., forcing the A.C. across the path of least impedance, i.e., across the condensor.

Looking at the circuit of detector B, the A.C. output from the amplification stage is fed across condensor 28 to the base of a transistor 31, the emitter of this transistor 31 is coupled to the emitter of the corresponding transistor 32 of detector A, in a back-to-back coupling across condensors 33 and unidirectional crystals or diodes 34. Midway 35, between the unidirectional means, e.g., crystals or diodes 34 is a feedback line 36 going to the input of the amplification stage 25 of detector A. Along feedback line 36 is an integrator stage 37 to transform the pulsating current along line 36 to D.C. If the output from the emitter of transistor 32 subtracted from the emitter of transistor 31 equals zero, the current at the junction or midpoint 35 will be zero and there will be no feedback input at amplifier stage 25. If the current at the junction point is not zero, there will be a feedback along feedback line 36 to the amplification stage adjusting the amplification of transistor 25 until the current at the junction is zero. Thus, the outputs of detectors A and B are equalized, when the area of the triangle is $\sqrt{3}\times$ that of the square, i.e., when the sun line image on the square and triangle are of equal length for an on-center sun position.

But, as hereinbefore described, the triangle area is one-half the square area, and the line image of the triangle will be one-half the length of the line image on the square for an on-center sun position. This factor may be electronically compensated in numerous ways by those skilled in the art. Perhaps the simplest compensation can be provided by means of resistors on both sides of midpoint 35, if the resistor 38 on the detector B, i.e., the square detector side has twice the resistivity or ohmic value as resistor 39 on the detector A, i.e., on the triangular detector side, then the voltage drop at the midpoint 35 will be equal on both sides for equal conditions.

The sun direction is interpreted from the ratio of the sun image line on the triangle to that on the square, or, $A_{DC}:B_{DC}$ as hereinbefore explained. The sun D.C. photo cell output across coils 29 and 30 is then fed to a division circuit 40. There are numerous ways of performing such division known in the art, some of which have been described by Clarence L. Johnson, "Analog Computer Techniques" McGraw-Hill Company, Inc., New York, 1956. Also, if the detector cells are so chosen that the voltage output is logarithmically proportional to the input illumination, the operation of division may be performed by a simple voltage subtraction, i.e., the voltage of one detector bucking the voltage of the other detector and reading the output voltage.

To increase the accuracy of the reading, so that the output of the detector cells are perfectly linear, the triangular cell may be covered with a mask. The mask is simply applied to the three tips of the triangle so that the tips are curved and not pointed. Several sources of constant non-linearity exist within the system, and, although precise mathematical explanations may be found for the mask design it is much simpler to make the mask by trial and error. This feature is of course optional, since the error will occur only at the extreme positions of the line on the triangle.

In an unmanned vehicle aimed in a particular direction, generally a plurality of the sun trackers herein described will be sufficient to constantly have the sun in the view of at least one sun tracker. To completely cover a vehicle on all sides would require somewhere in the order of forty such sun trackers having a thirty degree field of view, but, in practice, such a large number is unnecessary since the general direction of the vehicle will be fixed.

It is to be observed therefore that the present invention provides an improvement in a sun tracker, which comprises in combination, a housing; a pair of cylindrical lenses 14 and 15 at one end thereof, the cylindrical axes of said lens being disposed at right angles, the bases of said lens being preferably in the same plane, each of said lens forming part of a section, X or Y, designed to determine the sun bearing with respect to a vehicle on which the sun tracker is mounted, i.e., azimuth or elevation. There is a beam splitter 18 and 19 in each section capable of splitting the sun image coming through said lens. In each section there is a rectangular photo cell detector 12 and 13 disposed at about the split focus of said lens so as to receive one of said split images, said rectangle being preferably in a plane parallel to the plane of the lens base and two sides of said rectangle being parallel to said lens cylindrical axis; and a triangular photo-cell detector, isosceles or equilateral 14 and 15, disposed at about the other split focus of said lens so as to receive the other of said split sun images, the base of said triangular detector being parallel to said lens cylindrical axis, said triangular detector being in a plane at right angles to the plane of said rectangular detector; circuits associated with each of said detectors capable of causing a D.C. electric current to flow in response to the action of light thereon; a flashing light source 23 and 24 in each section adapted to illuminate the detectors in its section equally, said flashing giving rise to an A.C. detector output current; separation means, e.g., a condenser 27 and 28 and choke coil 29 and 30 in said circuits to separate said A.C. and D.C. outputs; bridge means, e.g., transistors 31 and 32 with emitters in back to back relationship, between the two A.C. outputs in each section, said bridge means including a midpoint 35 which is at null when the voltage drop on one side of the bridge equals the voltage drop on the other; a feedback line 36 from said midpoint to the input of one of said detector circuits, e.g., amplification stage transistor to have any current flow value in said bridge fed back to said input so as to obtain a null value in said bridge; an integrator stage 37 along said feedback circuit 36 to convert said A.C. feedback to D.C.; and a division circuit to divide the D.C. output of one detector in a section by the output of the other detector in said section. The triangle is preferably an equiangular triangle with an area equal to one half the area of the other detector which is preferably a square. However, in such a case, compensation means, e.g., resistors on both sides of the bridge are required so that the voltage on one side should be equal to the voltage on the other side under ideal conditions. This is accomplished by having the value of one of the resistors be exactly half that of the other.

Furthermore, it is to be observed that when used herein, the term division includes also logarithmic division, and that the geometric configuration of the detectors need not necessarily be a square and triangle as depicted in the drawings since the combination of other geometric forms may likewise be used under given conditions.

The azimuth and elevation information may be converted to digital form for telemetering to an observer, recorded for future reference, or used to control the orientation of the vehicle, etc.

Some of the features of the present invention will also be found in a co-pending patent application likewise entitled Sun Tracker in which the present inventor Donald K. Wilson was assisted by his colleague Robert L. Willes, Serial No. 6,785 filed on February 4, 1960 of which the present application is a continuation in part.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A sun tracker, comprising in combination, a viewing section capable of projecting the sun image as two lines at right angles to each other; a detection section adapted to have each line image of the sun projected by the viewing section sensed by at least two detectors, one detector whose geometric configuration is so disposed with regard to the viewing section as to constantly sense the entire projected sun image, and the other detector having a geometrical configuration whose cross sectional linear dimension varies linearly from the central portion thereof, and so disposed with respect to said viewing section that said detector cross-sectional linear dimension varies linearly from the central portion thereof; equalization means for each section to obtain a ratio of detector output between the detectors in each section which will correspond to the ratio of the sun image size on one detector as compared with the sun image size on the other detector in said section, and, a division circuit to divide the output of one detector in a section by the output of the other detector in said section.

2. In a sun tracker, a housing; a pair of cylindrical lenses at one end thereof, the cylindrical axes of said lenses being disposed at right angles, each of said lenses forming part of a section; a beam splitter in each section capable of splitting a beam from said lens; a rectangular detector in each section disposed so as to receive one of said split beams, two sides of said rectangle being parallel to said lens cylindrical axis; a triangular detector in each section disposed so as to receive the other of said split beams, one side of said triangle being parallel to said lens cylindrical axis; equalization means for each section to obtain a ratio of detector output between the detectors in each section which will correspond to the ratio of the sun image size on one detector as compared with the sun image size on the other detector in said section, and, a division circuit to divide the output of one detector in a section by the output of the other detector in said section.

3. In a sun tracker, a housing; a pair of cylindrical lenses at one end thereof, the cylindrical axes of said lenses being disposed at right angles, each of said lenses forming part of a section; a beam splitter in each section capable of splitting a beam from said lens; a rectangular detector in each section disposed so as to receive one of said split beams, two sides of said rectangle being parallel to said lens cylindrical axis; an isosceles triangular detector in each section disposed so as to receive the other of said split beams, the base of said triangle being parallel to said lens cylindrical axis; equalization means for each section to obtain a ratio of detector output between the detectors in each section which will correspond to the ratio of the sun image size on one detector as compared with the sun image size on the other detector in said section, and, a division circuit to divide the output of one detector in a section by the output of the other detector in said section.

4. In a sun tracker, a housing; a pair of cylindrical lenses at one end thereof, the cylindrical axes of said lenses being disposed at right angles, each of said lenses forming part of a section; a beam splitter in each section capable of splitting a beam from said lens; a rectangular photo cell detector in each section disposed at about one split focus of said lens so as to receive one of said split beams, two sides of said rectangle being parallel to said lens cylindrical axis; an isosceles triangular photo cell detector in each section disposed at about the other split focus of said lens so as to receive the other of said split beams; the base of said triangular detector being parallel to said lens cylindrical axis, circuits associated with each of said detectors capable of causing a D.C. electric current to flow in response to the action of light thereon; a flashing light source in each section adapted to illuminate the detectors in its section equally; said flashing giving rise to an A.C. detector output current; separation means in said circuits to separate said A.C. and D.C. outputs; bridge means between the two A.C. outputs in each section, said bridge including a midpoint which is at null when the voltage drop on one side of the bridge equals the voltage drop on the other; feedback means from said midpoint to the input of one of said detector circuits to have any current flow value in said bridge fed back to said input so as to obtain a null value in said bridge; and, a division circuit to divide the D.C. output of one detector in a section by the output of the other detector in said section.

5. In a sun tracker, a housing; a pair of cylindrical lenses at one end thereof, the cylindrical axes of said lenses being disposed at right angles, each of said lenses forming part of a section; a beam splitter in each section capable of splitting a beam from said lens; a rectangular photo cell detector in each section disposed at about the split focus of said lens so as to receive one of said split beams, two sides of said rectangle being parallel to said lens cylindrical axis; an isosceles triangular photo cell detector in each section disposed at about the other split focus of said lens so as to receive the other of said split beams; the base of said triangular detector being parallel to said lens cylindrical axis, circuits associated with each of said detectors capable of causing a D.C. electric current to flow in response to the action of light thereon; a flashing light source in each section adapted to illuminate the detectors in its section equally, said flashing giving rise to an A.C. detector output current; separation means in said circuits to separate said A.C. and D.C. outputs; bridge means between the two A.C. outputs in each section, said bridge including a midpoint which is at null when the voltage drop on one side of the bridge equals the voltage drop on the other; feedback means from said midpoint to the input of one of said detector circuits to have any current flow value in said bridge fed back to said input so as to obtain a null value in said bridge; an intergrator circuit along said feedback circuit to convert said bridge; and, a division circuit to divide the D.C. output of one detector in a section by the output of the other detector in said section.

6. In a sun tracker, a housing; a pair of cylindrical lenses at one end thereof, the cylindrical axes of said lenses being disposed at right angles, each of said lenses forming part of a section; a beam splitter in each section capable of splitting a beam from said lens; a rectangular photo cell detector in each section disposed at about the split focus of said lens so as to receive one of said split beams, said rectangle being in a plane parallel to the plane of the base of said cylindrical lens, two sides of said rectangle being parallel to said lens cylindrical axis; an isosceles triangular photo cell detector in each section disposed at about the other split focus of said lens so as to receive the other of said split beams; the base of said triangular detector being parallel to said lens cylindrical axis, said triangular detector being in a plane at right angles to the plane of said rectangular detector circuits associated with each of said detectors capable of causing a D.C. electric current to flow in response to the action of light thereon; a flashing light source in each section adapted to illuminate the detectors in its section equally, said flashing giving rise to an A.C. detector output current; separation means in said circuits to separate said A.C. and D.C. outputs; bridge means between the two A.C. outputs in each section, said bridge including a midpoint which is at null when the voltage drop on one side of the bridge equals the voltage drop on the other; feedback means from said mid-point to the input of one of said detector circuits to have any current flow value in said bridge fed back to said input so as to obtain a null value in said bridge; an integrator circuit along said feedback circuit to convert said A.C. feedback to D.C. and, a division circuit to divide the D.C. output of one detector in a section by the output of the other detector in said section.

7. In a sun tracker, in combination, a housing; a pair of cylindrical lenses at one end thereof, the cylindrical axes of said lens being disposed at right angles, the bases of said lenses being in the same plane, each of said lenses forming part of a section designed to determine the sun bearing in azimuth or elevation with respect to a vehicle on which the sun tracker is mounted, a beam splitter in each section capable of splitting the sun image coming through said lens a rectangular photo cell in each section disposed at about the split focus of said lens so as to receive one of said split images, said rectangular photo cell detector being in a plane parallel to the plane of the lens base and two sides of said rectangle being parallel to said lens cylindrical axis; an equilateral triangular photocell detector disposed at about the other split focus of said lens so as to receive the other of said split images, the base of said triangular detector being parallel to said lens cylindrical axis, said triangular detector being in a plane at right angles to the plane of said rectangular detector; circuits associated with each of said detectors capable of causing a D.C. electric current to flow in response to the action of light thereon; a flashing light source in each section adapted to illuminate the detectors in its section equally, said flashing giving rise to an A.C. detector output current; an amplification stage associated with each detector, A.C. and D.C., separation means, including a condensor and choke coil combination in said circuits, bridge means including transistors with emitters in back to back relationship, between the two A.C. outputs in each section, said bridge means including a midpoint which is at null when the voltage drop on one side of the bridge equals the voltage drop on the other; a feedback line from said midpoint to the input of one of said detector amplification stage to have any current flow value in said bridge fed back to said input so as to obtain a null value in said bridge; an integrator stage along said feedback circuit to convert said feedback to D.C.; and a division circuit to divide the D.C. output of one detector in a section by the output of the other detector in said section.

8. A device as claimed in claim 7 where the rectangular detector is a square, and the area of the equilateral triangular detector is $\sqrt{3} \times$ that of the square.

9. A device as claimed in claim 7 where the rectangular detector is a square, the area of the equiangular triangular detector is one-half that of the square, and compensation means are provided in the bridge means to equalize the voltage drop to said bridge midpoint.

References Cited in the file of this patent

UNITED STATES PATENTS

| | | |
|---|---|---|
| 2,489,220 | Herbold | Nov. 22, 1949 |
| 3,025,023 | Barghausen | Nov. 13, 1962 |